United States Patent
Baracchini et al.

(10) Patent No.: US 6,851,283 B2
(45) Date of Patent: Feb. 8, 2005

(54) THERMOINSULATING MAT OF MINERAL FIBERS WITH RANDOM ORIENTATION

(75) Inventors: Paolo Baracchini, Pully (CH); Jean-Pierre Vullieme, Lucens (CH)

(73) Assignee: Isover Saint-Gobain, Courbevoie (FR)

(*) Notice: Subject to any disclaimer, the term of this patent is extended or adjusted under 35 U.S.C. 154(b) by 0 days.

(21) Appl. No.: 09/419,891

(22) Filed: Oct. 18, 1999

(65) Prior Publication Data

US 2002/0168521 A1 Nov. 14, 2002

Related U.S. Application Data

(63) Continuation of application No. 08/218,295, filed on Mar. 28, 1994, now abandoned, which is a continuation of application No. 08/001,208, filed on Jan. 6, 1993, now abandoned, which is a continuation of application No. 07/631,086, filed on Dec. 19, 1990, now abandoned.

(30) Foreign Application Priority Data

Dec. 19, 1989  (CH) ............................................. 4567/89
May 29, 1990  (CH) ............................................. 1809/90

(51) Int. Cl.$^7$ ......................... C03B 37/00; C03B 37/075
(52) U.S. Cl. ........................ 65/438; 65/504; 442/327; 442/334; 442/348; 442/352; 442/355

(58) Field of Search .................. 65/438, 504; 442/327, 442/334, 348, 352, 355; 428/288, 296, 340, 378, 394, 396, 404, 903, 290

(56) References Cited

U.S. PATENT DOCUMENTS

| | | | |
|---|---|---|---|
| 4,632,685 A | * | 12/1986 | Debouzie et al. .............. 65/517 |
| 5,308,692 A | * | 5/1994 | Kennedy et al. ............. 428/290 |

FOREIGN PATENT DOCUMENTS

| | | |
|---|---|---|
| AU | 69454/81 | 10/1981 |
| AU | 29514/84 | 6/1985 |
| JP | 58-208455 | 12/1983 |
| JP | 62-172896 | 11/1987 |

* cited by examiner

Primary Examiner—Thurman K. Page
Assistant Examiner—Simon J. Oh
(74) Attorney, Agent, or Firm—Oblon, Spivak, McClelland, Maier & Neustadt, P.C.

(57) ABSTRACT

A mat of mineral fibers has a random or quasi-random fiber orientation. The fibers have diameters which, for the great majority of them, are 2.5 to 4.5 micrometers, and a length of 2 to 15 cm. Its density is less than 40 kg/m$^3$. Its resistance to compression, for a crushing of 10%, is equal to at least 0.5 kN/m$^2$. The fineness of the fibers and their random distribution imparts to the mat an exceptional lightness and an excellent flexibility, making possible the perfect application of the mat on cylindrical surfaces.

3 Claims, 1 Drawing Sheet

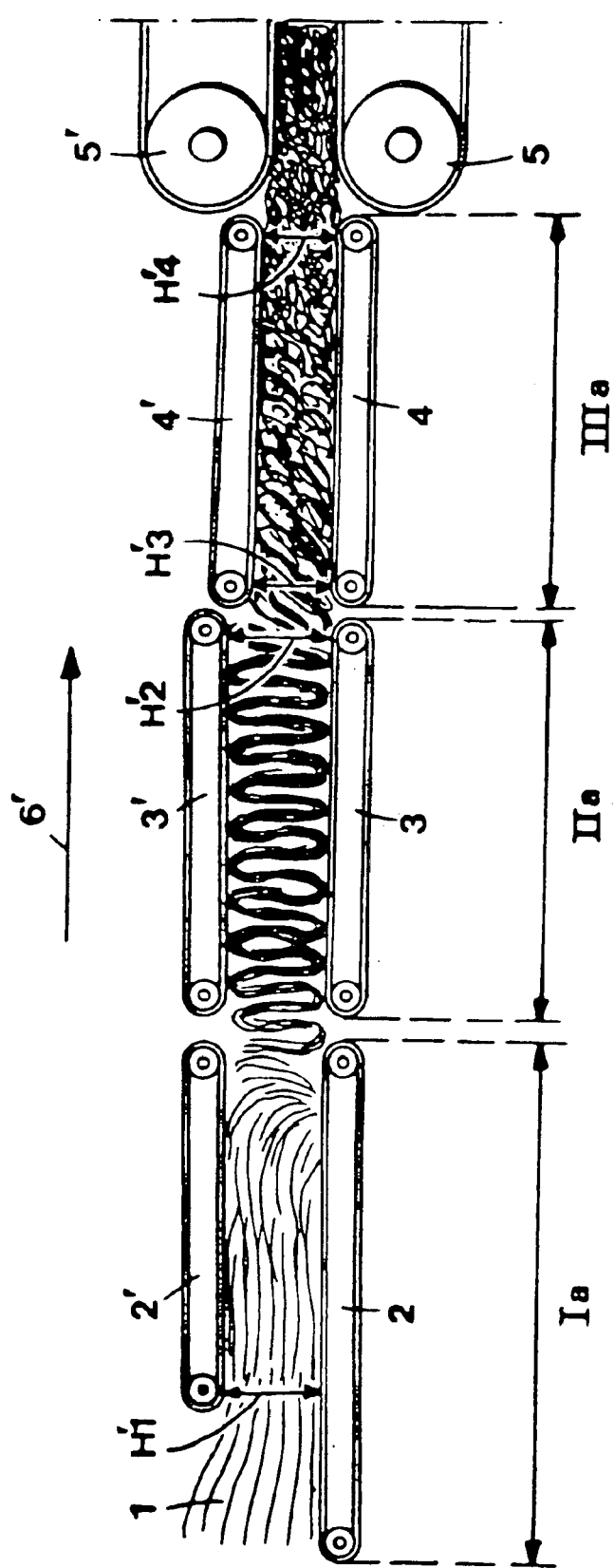

THERMOINSULATING MAT OF MINERAL FIBERS WITH RANDOM ORIENTATION

This application is a Continuation of application Ser. No. 08/218,295, filed on Mar. 28, 1994, now abandoned, which is a continuation of application Ser. No. 08/001,208, filed Jan. 6, 1993, abandoned, which is a continuation of application Ser. No. 07/631,086 filed Dec. 19, 1990, abandoned.

BACKGROUND OF THE INVENTION

Processes for production of thermoinsulating mats or felts of mineral fibers (glass fibers or rock fibers) whose orientation is almost random, as described in European patent 0 133 083, are already known. These products have advantageous qualities, but they have a high density (from 50 to 150 kg/m3) and do not have a sufficient flexibility for some applications, in particular for applying such insulating mats to cylindrical surfaces, e.g., of tanks, without forming pockets of condensation on the side in contact with the cylindrical surface and without forming cracks in their outside surface.

SUMMARY OF THE INVENTION

This invention has as an object to provide a product having the qualities required for the above applications.

It has unexpectedly been found that by reducing the diameter of the fibers very appreciably, relative to the known fibers, a product having the desired qualities and a density clearly lower than that of similar known products can be produced.

This invention comprises a thermoinsulating flexible mat of double crimpes mineral fibers having a substantially random orientation in which the great majority of fibers have a diameter between 2.5 and 4.5 micrometers and a length from 2 to 15 cm and in which the mat has a density not greater than 40 kg/m$^3$.

BRIEF DESCRIPTION OF THE DRAWINGS

By way of example, an embodiment of the mat according to the invention will now be described with reference to the accompanying drawing which shows, by way of example, how the mat according to the invention can be produced. The drawing schematically shows an installation for the production of a thermoinsulating mat of mineral fibers having a quasi-random orientation according to the invention.

DESCRIPTION OF THE PREFERRED EMBODIMENT

Known mats of mineral fibers having a quasi-random orientation are formed from glass or rock fibers having a diameter of 6 to 14 micrometers and a length of several centimeters. According to the invention, the mat is formed by much finer mineral fibers having, for the great majority of them, an average diameter of 2.5 to 4.5 micrometers and a length of 2 to 15 cm.

How an insulating mat having the desired qualities indicated above can be produced with such a material will now be described.

In a conventional way, the felts of mineral fibers continuously formed by placing on a conveyor fibers which are conveyed by gas streams. The conveyor holds the fibers and allows the gases to pass.

Before they are placed on the conveyor, the fibers are coated with a resinous composition intended to bind the fibers to one another, thus giving cohesiveness to the felt which is formed. The resinous composition, applied in liquid form, is crosslinked by a heat treatment performed on the felt previously brought to the desired thickness and density.

The forming of felts by deposition of fibers on the reception conveyor, or on a similar element, leads to a tangling of the fibers which is not homogeneous in all directions. Instead it has been experimentally found that the fibers have a strong tendency to be placed parallel to the reception surface. This tendency is all the more pronounced as the fibers are longer.

In the installation shown in the drawing, the fibers arrive in the form of a mat 1 which is then subjected, as will be explained, to a double crimping which is achieved at two places. This mat first passes into an upstream section formed as two zones Ia and IIa which have different sections. A zone IIIa forms a downstream section from which the mat having nonpolymerized glue thereon is conducted to a polymerization oven (not shown).

The mat or felt of glass fibers (or other mineral fibers) arrives at 1 with nonpolymerized glue thereon and passes, with an initial speed which is the same as that of an upstream conveyor, between a pair of conveyors 2, 2'.

After exiting conveyors 2, 2' of zone Ia, the felt arrives on pair of conveyors 3, 3' of zone IIa, having a much lower speed than that of conveyor 2, 2', which produces a longitudinal compression of the product and a first crimping, as illustrated in the drawing.

After exiting conveyors 3, 3', the felt, crimped a first time, arrives between pair of conveyors 4, 4' of zone IIIa, having a lower speed than that of conveyors 3, 3'. This results in a second compression of the product between conveyors 4, 4' and a second crimping being given to the final product, as well as in a completely random arrangement of fibers, as shown in the drawing.

Then, the product arrives at a pair of conveyors 5, 5', which make the felt pass into a polymerization oven (not shown).

The direction of movement of the felt is indicated by arrow 6'.

Due to the double crimping and the use of fine fibers, a product is obtained having a lower apparent density (LAD) and a greater flexibility, making it suitable, for example, for use in the thermal insulation of large tanks in the open air, by winding on the periphery of these tanks.

Concrete examples of various values (speeds of various conveyors and input and output heights of some conveyors) will now be given.

The first longitudinal compression produced by the passage of the felt through conveyors 2, 21 of zone Ia to conveyors 3, 3' of zone IIa is achieved by giving to the latter a speed which is, for example, 2.5 times lower than that of the conveyors of zone Ia. This produces the undulated structure visible in the drawing.

The second longitudinal compression is obtained by giving conveyors 4, 4' of zone IIIa a speed which is, for example, 2.5 times lower than that of the conveyors of zone IIa. This produces a random and homogeneous structure.

Speed $v_1$ of conveyors 2, 2' of zone Ia is equal to the input speed of the felt in 1. The latter is adjusted to obtain the desired ratio of speeds (or of crimping).

The speed of conveyors 4, 4' of downstream zone IIIa is equal to the speed of conveyors 5, 5' bringing the felt to the oven, which avoids any accidental packing or decrimping during the passage of the mat from zone IIIa to the oven.

The speed of the conveyors of zone Ia is equal to input speed $v_r$ of the felt in 1.

The speed of the conveyors in zone IIa is, for crimping, calculated as a function of the ratio of input speed vr of the felt to speed under study $v_c$, therefore $v_r/v_c$ (crimping speed), is:

$$Vzone\ IIa = \frac{Vr}{\sqrt{Vr/Vc}}$$

The adjustment of the thicknesses of the felt takes place as follows:

Upstream Section, Zones Ia and IIa
if H'1 is the input height in the conveyor of zone Ia,
if H'2 is the output height of the conveyors of zone IIa,
if Ee is the final thickness of the mat, selected according to the desired apparent density (LAD),
then:
H'1=(1.2 to 2.3). Ee;
H'2=(1.3 to 2.4). Ee;
Downstream Section, Zone IIIa;
if H'3 is the input height between conveyors 4 and 4',
if H'4 is the output height between conveyors 4 and 4',
then:
H'3 (1.0 to 1.30). Ee;
H'4 (1.0 to 1.20). Ee;

Conveyors 3, 3' and 4, 4' oppose an increase in the thickness of the mat under the effect of the axial pressure that it undergoes.

The two sections, upstream (Ia and IIa) and downstream (IIIa), are mechanically connected to one another and are placed on a traveling path making possible the positioning of their unit relative to the oven.

Each conveyor is equipped with a conveyor belt driven by a dc geared motor unit making possible a precise adjustment of the speeds to the desired values.

Thanks to the fineness of the fibers and to the completely random arrangement of the insulation fibers in the finished product, the latter has a compact surface, a good flexibility and a constant thickness with good insulation qualities.

The application of the product to large plane or nonplane (concave or convex) surfaces is easy. The product offers a resistance to compression which is sufficient to make it possible to apply on it a protective coating or a layer of additional insulation. The product can be in the form of a felt roll, lending itself well to the application to the outside face of a fire-resistant coating and to cylindrical surfaces.

The product thus obtained exhibits the following characteristics:

random or quasi-random distribution of the fibers (glass or rock fibers), great fineness of the fibers (diameters of 2.5 to 4.5 micrometers), length of the fibers of 2 to 15 cm, apparent density (LAD) less than or equal to 40 kg/m$^3$, resistance to compression (for a crushing of 10%) greater than or equal to 0.5 kN/m$^2$, heat conductivity coefficient less than or equal to 0.040 W/mK.

The final mat can have a thickness of 20 to 200 mm.

The mat can have a further surfacing, i.e., it can be coated with one or two adherent sheets of paper, aluminum, polyethylene or PVC.

The random distribution of the fine fibers used assures, during the winding of the mat around a cylindrical surface, that this winding is performed without deformation of the inside and outside surfaces, which are thus perfectly cylindrical with good application on the element to be insulated, avoiding any pockets of condensation of the inner side and any cracks of the outer side.

What is claimed as new and desired to be secured by Letters Patent of the United States is:

1. A process for manufacturing a thermoinsulating flexible mat of mineral fibers having a quasi-random orientation, comprising the steps of:

producing an initial felt of fiber material comprising fibers a majority of which have a diameter between 2.5 and 4.5 micrometers and a length of 2 to 15 centimeters;

a first step of longitudinal compression of the initial felt to produce a felt having an undulated fiber structure;

a second step of longitudinal compression of the felt having the undulated fiber structure to produce a compressed mat having a random arrangement of the fibers, wherein the compressed mat has a density not greater than 40 kg/m$^3$.

2. The process of claim 1 wherein the longitudinal compression in said first step is performed by conveyors having a speed ratio of 2.5:1.

3. The process of claim 2 wherein the longitudinal compression in said second step is performed by conveyors having a speed ratio of 2.5:1.

* * * * *